L. C. HUNTER.
BED.
APPLICATION FILED DEC. 13, 1915.
1,218,775.
Patented Mar. 13, 1917.
2 SHEETS—SHEET 1.
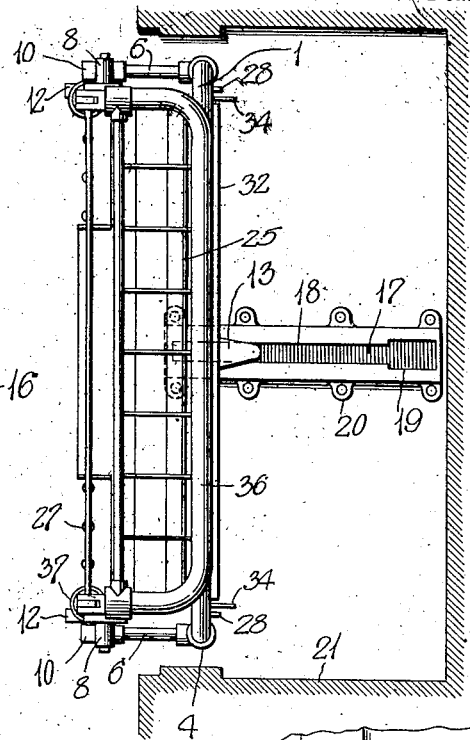
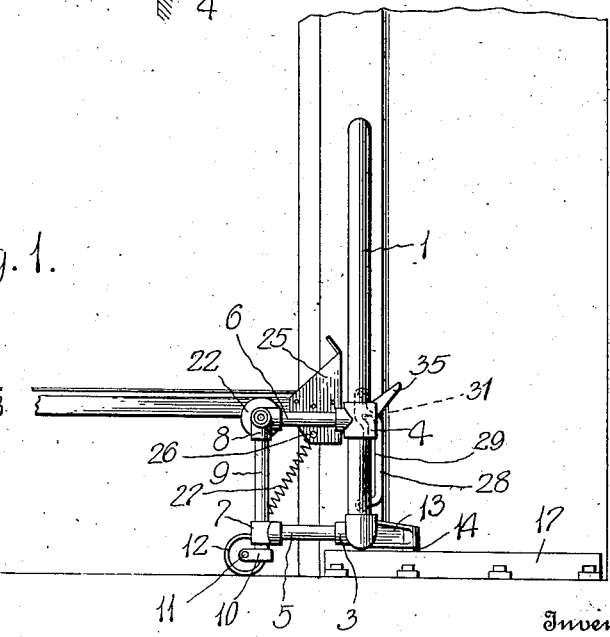
Witnesses
Chas. W. Stauffer
Karl H. Butler
Inventor
Lewis C. Hunter,
By
Attorneys

L. C. HUNTER.
BED.
APPLICATION FILED DEC. 13, 1915.

1,218,775. Patented Mar. 13, 1917
2 SHEETS—SHEET 2.

Witnesses
Chas W. Stauffer
Karl H. Butler

Inventor
Lewis C. Hunter,
By
Attorneys ated guide members 28 having slots 29 with
UNITED STATES PATENT OFFICE.

LEWIS C. HUNTER, OF DETROIT, MICHIGAN.

BED.

1,218,775.  Specification of Letters Patent.  Patented Mar. 13, 1917.

Application filed December 13, 1915. Serial No. 66,478.

*To all whom it may concern:*

Be it known that I, LEWIS C. HUNTER, a citizen of the United States of America, residing at Detroit, in the county of Wayne and State of Michigan, have invented certain new and useful Improvements in Beds, of which the following is a specification, reference being had therein to the accompanying drawings.

This invention relates to disappearing beds, and more particularly to that type of foldable bed disclosed by my pending application June 21, 1915, Serial No. 35,353. In this application there is shown a foldable bed that can be easily and quickly swung into and out of a closet, alcove or recess or a suitable enclosure, the bed depending upon a novel pivotal means by which a bed of greater width than a wall opening may be shifted in and out of the opening. The application also includes novel means for preventing sudden movement of a foldable bed frame and my present invention not only provides additional means for controlling the folding of a bed frame, but provides a novel track and truck which permits of a foldable bed being easily moved in and out of a closet or wall recess.

Such structural devices entering into the present invention will be hereinafter referred to, and reference will now be had to the drawings, wherein—

Figure 1 is a side elevation of my improved bed in a lowered and active position, and with the central portion of the bed broken away;

Fig. 2 is a plan of the bed in a folded position, and partly within a closet or wall recess;

Fig. 3 is an enlarged plan of a portion of a track and truck, showing how the truck may be swung whereby the bed structure may be placed in a desired position;

Figure 4:
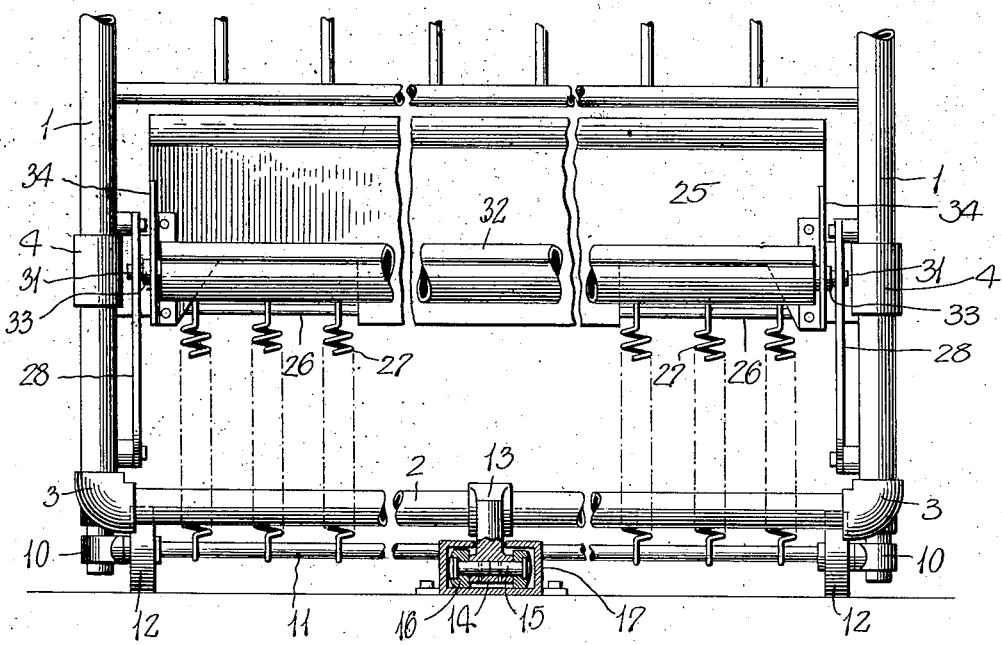
Fig. 4 is a fragmentary rear elevation of the bed structure, showing the track and truck in cross section.

The bed structure comprises a head piece having posts 1 and a bottom rail 2 connected to the lower ends of said posts by three-way connections 3. The posts 1 are provided with T fittings 4 and connected to said fittings are forwardly projecting arms 6 provided with fittings 8. Connected to the three-way connections 3 are forwardly projecting arms 5 provided with fittings 7. The fittings 7 and 8 support legs 9, and at the lower ends of the legs are bearings 10 for a transverse axle 11. On the axle 11, adjacent the legs, are wheels 12 and these wheels are adapted to coöperate with a truck on the head piece in facilitating the movement of the bed structure when folded.

The bottom rail 2, intermediate the ends thereof, has a rearwardly projecting arm 13 and a depending head 14. Mounted in the head 14 is an axle 15 having the ends thereof provided with rollers or wheels 16 and these rollers or wheels are adapted to travel in a box or channel track 17 having both ends thereof closed by a wall to limit the movement of the truck relative to said track. The top of the box track has a longitudinal slot 18 providing clearance for the depending head of the arm 13 and one end of the slot 18 is enlarged, as at 19, whereby with the truck lengthwise of the track it can be easily placed therein. The box track has apertured ears or lugs 20 whereby it may be connected to the floor of a closet or inclosure 21 adapted to house the bed structure, when folded.

The fittings 8 are provided with pivot members 22 for side rails 23 of the bed structure and said rails have the inner or rear ends thereof connected by a transverse angle bar 24. At the juncture of said side rails with the angle bar 24 are corner pieces or angle plates 25 connected by a transverse rod 26 and connecting this rod to the rod 11 are a plurality of coiled retractile springs 27.

On the confronting sides of the posts 1 are guide members 28 having slots 29 with the upper ends of the slots terminating in seats 30. Extending into the slots 29 of the guide members 28, are the stepped spindles or ends 31 of a weight 32, which may be in the form of a tube or cylinder filled with concrete or other material to lend weight to the same. The weight constitutes a counterbalanced member brought into action at predetermined times to prevent a sudden movement of the bed structure, when being raised or lowered, yet facilitates such operation.

On the spindles or ends of the counterbalanced member are anti-friction sleeves or rollers 33 adapted to be engaged by hook members 34 carried by the corner or angle pieces 25 of the bed structure. The hook members 34 have cam extensions 35 and these extensions are adapted to engage the ends of the counterbalance member when the same rests in the lower ends of the guide member 28, as shown by dot and dash lines in Fig. 5.

The side rails 23 of the bed structure, have a foot piece 36 provided with foldable legs 37 and the side rails 23 are connected by a transverse angle bar 38 coöperating with the angle bar 24 in supporting a conventional form of bed spring 39.

Figures 5, 6:
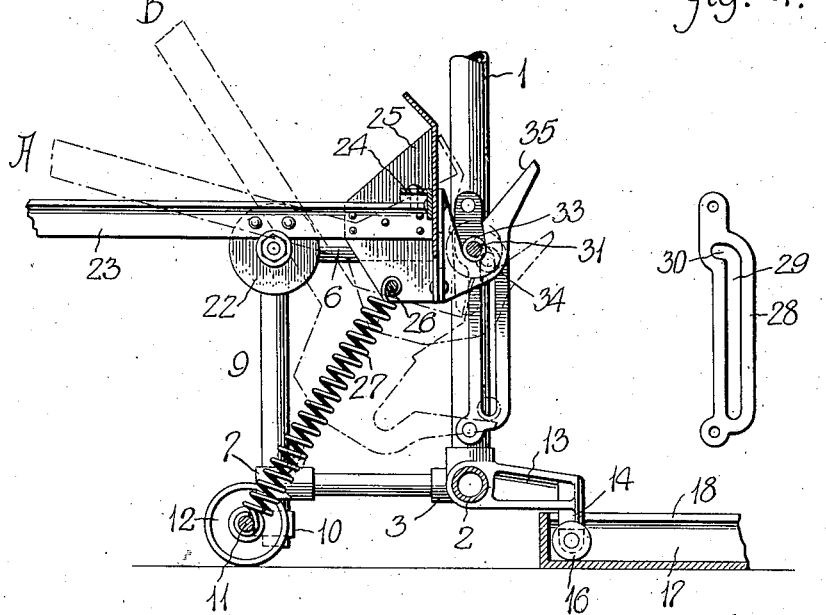
Fig. 5 is an enlarged longitudinal sectional view of a portion of the bed structure, showing by dot and dash lines the positions which the foldable bed frame assumes when raised or lowered.
Fig. 6 is an elevation of a detached guide member adapted to form part of the bed structure.

The function or purpose of the counterbalance member 32 is best understood by reference to Fig. 5, showing the bed structure in a lowered position with the ends or spindles 31 of the counterbalance member resting upon the seats 30 of the guide members 28, thus relieving the pivoted side rails 23 of the weight of the counterbalance member. Assuming that the bed structure is to be raised to an inactive position, a partial elevation of the foot end of the bed structure removes the ends of the counterbalance member from the seats 30 of the guide members, and as the bed structure assumes an angle approximately that indicated at 3ᴬ, the counterbalance member is brought into action and thus facilitates elevation of the bed structure. This is accomplished by the counterbalance being supported by the hook members 34 and as the counterbalance shifts the bed structure upwardly to an angle approximately that indicated by B, the ends of the spindles 31 of the counterbalance member have reached the lower ends of the slots 29 of the guide members 28 to rest therein, while the springs 27 continue the movement of the bed structure to that of a folded or inactive position.

As the bed structure has a tendency to open or lower after assuming a certain angle, the counterbalance member 32 retards a sudden action by reason of the cam extensions 35 picking up and raising the counterbalance member 32 as the bed structure is pulled down to a horizontal position. In raising or lowering the bed structure, it is apparent that the counterbalance member is brought into action at predetermined and opportune times preventing injury to the bed structure and at the same time facilitating its operation.

With the bed structure folded or in a raised position, the central truck coöperates with the wheels 12 in providing a substantial movable base for the entire bed structure, and the box track 17 is adapted to prevent the bed structure from tilting forward when the bed is in a horizontal position. The box track also limits the movement of the bed structure in and out of the closet or inclosure 21 and the box track may be curved to place the bed structure at a desired position in or out of the closet. When out of the closet the central truck can be swung at an angle to the box track, as shown in Fig. 3, whereby the bed may be placed as desired relative to the opening of the closet or the wall recess in which the bed is housed. In using the term weight or counterbalance member, I mean such device as may be regulated to properly balance the pivoted bed structure, also such means as may be automatically moved into and out of action at predetermined times to facilitate raising and lowering the pivoted structure.

What I claim is:—

1. A foldable bed comprising a head piece, a movable counterbalance member supported thereby, and a bed structure pivoted relative to said head piece and adapted to pick up said counterbalance member after initial raising movement of said structure and discharge said counterbalance member before completing the rising movement of said structure.

2. A foldable bed comprising a head piece, a movable elevated member supported thereby and adapted to descend by gravity, and a bed structure pivoted relative to said head piece and adapted when partially elevated to release said member whereby said member controls the further movement of said bed structure.

3. The combination of a bed structure capable of being swung from a horizontal position to a vertical position, springs facilitating an initial and final movement of said bed structure and a counterbalance member inactive during an initial and final movement of said bed structure and adapted to be brought into action during the interim of such movements.

In testimony whereof I affix my signature in presence of two witnesses.

LEWIS C. HUNTER.

Witnesses:
 KARL H. BUTLER,
 ANNA M. DORR.